United States Patent
Kobashikawa et al.

(10) Patent No.: US 7,539,699 B2
(45) Date of Patent: May 26, 2009

(54) APPARATUS, SYSTEM AND METHOD FOR USE IN GENERATING AND MAINTAINING AN ELECTRONIC ADDRESS BOOK

(75) Inventors: Brian T. Kobashikawa, Santa Clara, CA (US); Brooke A. Thompson, San Francisco, CA (US); Gitanjali Bhatia, Hayward, CA (US); Pauli Wang, Sunnyvale, CA (US); Ryan K. Miller, Los Altos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 463 days.

(21) Appl. No.: 10/624,733

(22) Filed: Jul. 21, 2003

(65) Prior Publication Data

US 2004/0186848 A1 Sep. 23, 2004

Related U.S. Application Data

(60) Provisional application No. 60/456,616, filed on Mar. 21, 2003.

(51) Int. Cl.
*G06F 7/00* (2006.01)
*G06F 17/00* (2006.01)
(52) U.S. Cl. .................. 707/102; 707/100; 709/206
(58) Field of Classification Search ............. 707/1–10, 707/102, 100; 709/206; 705/27
See application file for complete search history.

(56) References Cited

U.S. PATENT DOCUMENTS

| | | | | |
|---|---|---|---|---|
| 5,938,725 A * | 8/1999 | Hara | ......................... | 709/206 |
| 5,966,714 A * | 10/1999 | Huang et al. | ................. | 707/201 |
| 6,356,937 B1 * | 3/2002 | Montville et al. | ........... | 709/206 |
| 6,564,264 B1 * | 5/2003 | Creswell et al. | ............. | 709/245 |
| 6,895,426 B1 * | 5/2005 | Cortright et al. | ............ | 709/206 |
| 6,952,805 B1 * | 10/2005 | Tafoya et al. | ................ | 715/739 |
| 2003/0037114 A1 * | 2/2003 | Nishio et al. | ................. | 709/206 |
| 2003/0078981 A1 * | 4/2003 | Harms et al. | ................. | 709/206 |
| 2003/0097361 A1 * | 5/2003 | Huang et al. | ................... | 707/10 |
| 2003/0158793 A1 * | 8/2003 | Takakura et al. | .............. | 705/27 |
| 2003/0231207 A1 * | 12/2003 | Huang | ......................... | 345/752 |
| 2004/0059784 A1 * | 3/2004 | Caughey | ..................... | 709/206 |

OTHER PUBLICATIONS

Que, "Special Edition Using Microsoft Outlook 2002", Publisher Que, May 17, 2001.*
"Special Edition Using Microsoft Outlook 2002", Publisher Que, Jun. 2001.*

* cited by examiner

*Primary Examiner*—Hosain T Alam
*Assistant Examiner*—Shew-Fen Lin
(74) *Attorney, Agent, or Firm*—Darby & Darby P.C.; Matthew M. Gaffney (57) ABSTRACT

The present invention provides an apparatus, system and method for use in generating and maintaining an electronic address book. The address book is generated and maintained by searching through archives of e-mails for e-mail addresses, evaluating the e-mail addresses based on criteria, and adding the e-mail addresses to an address book if the criteria is satisfied. In some embodiments, the address book is generating and maintaining by accessing an archive, searching the archive for the e-mail addresses, retrieving e-mail addresses, applying criteria to retrieved e-mail addresses, and adding addresses to an electronic address book if the criteria is met. The apparatus for use in establishing and updating an electronic address book includes means for scanning an archive and retrieving e-mail addresses, means for filtering the e-mail addresses if a criterion is met, and means for adding the e-mail addresses to the address book.

27 Claims, 9 Drawing Sheets

APPARATUS, SYSTEM AND METHOD FOR USE IN GENERATING AND MAINTAINING AN ELECTRONIC ADDRESS BOOK

CROSS-REFERENCE TO RELATED APPLICATION

This application claims priority under 35 U.S.C. 119(e) to U.S. Provisional Patent Application No. 60/456,616, filed Mar. 21, 2003, of Kobashikawa, et al., for ADDRESS BOOK BUILDER, which U.S. provisional patent application is hereby fully incorporated herein by reference.

BACKGROUND OF THE INVENTION

1. Field of the Invention

The present invention relates generally to electronic address books, and more particularly to an electronic address book providing updating features.

2. Discussion of the Related Art

Many devices and systems provide electronic address books. In particular, many e-mail services and/or systems provide users with electronic address books in which to store e-mail addresses. These address books allows a user to quickly access regularly used e-mail addresses once the e-mail addresses are incorporated into the address book.

Entry of e-mail addresses into the address book typically must be entered manually. A user must type in the information manually, one e-mail address at a time. This can be prohibitively time consuming, especially when the user wishes to add more than a few addresses. Some e-mail services or systems allow a user to select a single address from a single e-mail received by the user to be added to an address book (for example, when reading an e-mail or "Replying" to the e-mail) without a user having to manually enter the address. However, this process only adds a single address.

Further, many e-mail systems or services are operated over the Internet. A user accesses the e-mail service by accessing a web site. Some of these e-mail services provide address books as described above that are also accessed over the Internet. A user must manually enter individual addresses into his/her address book, or the e-mail system can add a single address based on a single e-mail in which the user is viewing or replying. Adding a single address over the Internet is a slow process due to the inherent latency of the Internet. As a result, adding several addresses to an address book over the Internet is very time consuming and cumbersome.

It is with respect to these and other background information factors that the present invention has evolved.

SUMMARY OF THE INVENTION

The present invention provides an apparatus, system and method for use in generating and maintaining an electronic address book. In one embodiment, a method for use in populating an electronic address book includes searching through at least one archive of e-mails for an e-mail address; evaluating the e-mail address based on a first defined criterion; and adding the e-mail address to an address book if the first criterion is satisfied. The method can further include searching an "In" field, a "sent" field and a "cc" field. The evaluating can include determining if the e-mail address already exists in the address book and adding the e-mail address if it does not already exist, and/or evaluating the e-mail address based on a second defined criterion and adding the e-mail address to the address book if both the first and the second criterion are satisfied.

In an alternative embodiment, the present invention provides a method for use in generating and maintaining an address book that includes accessing an electronic archive containing e-mail addresses; searching the archive for the e-mail addresses; retrieving one or more e-mail addresses; applying a first criterion to a first retrieved e-mail address; and adding the first retrieved address to an electronic address book if the first criterion is met.

The present invention further provides an apparatus for use in generating and updating an electronic address book. The apparatus includes an electronic address book configured to store one or more e-mail addresses; means for scanning configured to search one or more archives for at least one e-mail address and to retrieve the at least one e-mail address; means for filtering configured to receive the at least one e-mail address from the means for scanning and to pass the e-mail address if the e-mail address satisfies a criterion of the means for filtering; and means for adding configured to add the at least one e-mail address to the address book if the at least one address is passed by the filter. In some instances, the archive includes a plurality of e-mails having a plurality of fields and the means for scanning is configured to scan the plurality of fields of the plurality of e-mails.

In still another embodiment, the present invention provides for a computer readable medium encoded with code segments for use in populating an electronic address book, the computer readable medium includes a code segment for searching through at least one electronic archive of e-mails for e-mail addresses; a code segment for evaluating a retrieved e-mail address based on a first defined criterion; and a code segment for adding the e-mail address to an address book if the first criterion is satisfied.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION

The present invention provides an apparatus, system, architecture, process, computer readable medium encoded with code segments for implementing a process, and method for establishing and maintaining an electronic address book. Previous electronic address books require an individual to manually enter individuals, corporations and other contacts into the address book. This manual entry can be time consuming and cumbersome. Further, this process of manually entering contacts may be adequate when a user only wants to enter a few contacts. However, when a user has several contacts, this manual entry process becomes quite time consuming and cumbersome.

Some previous address books associated with e-mail tools (e.g., Microsoft's Outlook™) provide for an e-mail address to be added to an e-mail address book when a user replies to a previously received e-mail. This addition only provides for the addition of a single e-mail address. Further, these previous address books do not provide for a plurality of addresses to simultaneously be added to an address book.

The present invention provides for an electronic address book that can quickly and easily add any number of e-mail addresses to the address book. Further, the present invention allows additional information to be added in association with the e-mail address. Still further, the present invention is not limited to adding only those e-mail addresses to which the user replies. Alternatively, the present invention can simultaneously populate an address book with several e-mail addresses that are extracted and/or retrieved in substantially any archive, database or data storage of content that contains e-mail addresses. Additionally, the present invention can limit the entries into the address book based on predefined criteria and/or conditions. Thus, the resulting address book is quickly and easily populated and maintained with relevant addresses and/or contact information.

Users may not recognize the value of an address book because they do not have a base of contacts with which to begin. A user can perform basic e-mail functions and perform basic communication by either remembering an e-mail address in which the e-mail is being address, or the user just replies to a previously received e-mail message. Without several contacts, an address book may not be a priority to a user. However, once a user begins to acquire several contacts with which the user communicates, generating and adding the several contacts to an address book becomes an inhibitively slow and, in many instances, complicated process.

In some embodiments, the address book builder of the present invention is accessed over the Internet. However, because the present address book builder compiles and simultaneously adds a plurality of addresses to the address book, the present invention substantially eliminates the latency of adding addresses experienced by other electronic address books.

The present invention greatly simplifies establishing and maintaining an electronic address book. In some embodiments, a user address book is populated by parsing and/or searching received and/or sent e-mails for addresses. Further, the present address book builder populates the address book with those e-mail addresses that have some relevance based on predefined criteria. Providing a user with the ability to quickly and easily generate and update an address book provides an incentive to a user to utilize the address book. Further, because the user can quickly and easily update the address book, users will prefer to utilize the present address book over other electronic address books that might be available to the user.

Figure 1:
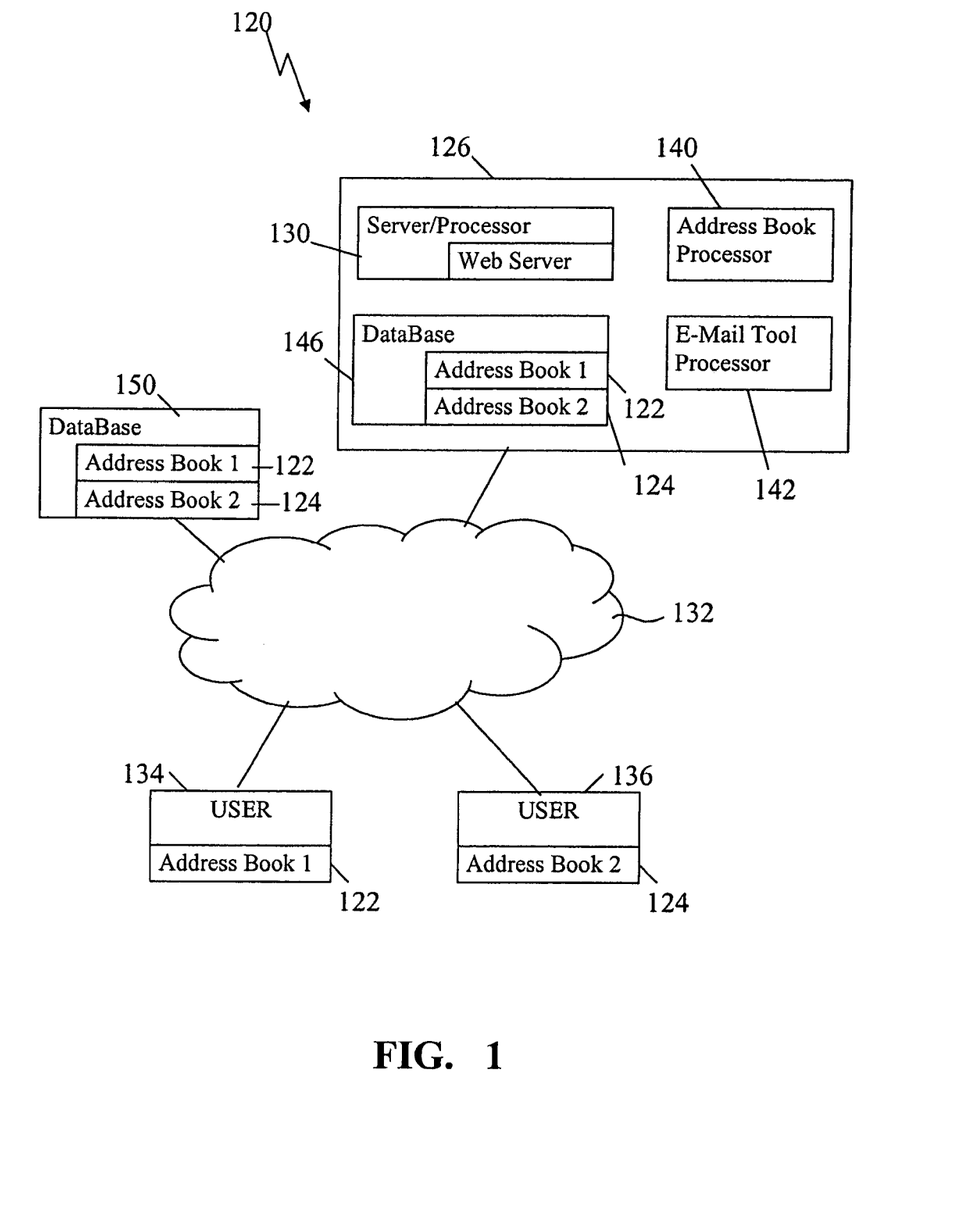
FIG. 1 depicts a simplified block diagram of a system according to one embodiment of the present invention for generating, populating and maintaining electronic address books.

FIG. 1 depicts a simplified block diagram of a system 120 according to one embodiment of the present invention for generating, populating and maintaining electronic address books 122, 124. The system 120 includes a host 126 that can be implemented through a computer, a plurality of computers, a server, a plurality of servers, one or more processors or a combination of computers, servers and/or processors 130. In one embodiment, the server 130 includes a web server 131 allowing users 134, 136 to access one or more web sites hosted by the web server 131 of the host device 126. The host 126 couples with a distributed network 132, such as the Internet, an intranet or other similar distributed networks. One or more users 134 and 136 can couple with the network 132 and access the host 126 through the network.

The host includes and is configured to provide the address book functionality 140 according to one embodiment of the present invention. The users 134, 136 can access the address book functionality 140 through the network 132. In some embodiments, the host 126 additionally provides e-mail functionality 142. However, an alternate server directly coupled with the host 126 or cooperating with the host over the network 132 can be included to provide the e-mail functionality. The host can additionally be configured to include a database 146 for storing address books 122, 124 for the users 134, 136. Alternatively or additionally, an external database 150 can be utilized to store users' address books. The external database 150 can be accessed by the host 126 and/or users 134, 136 through the distributed network or by direct coupling. In some embodiments, portions of or all of the user address books 122, 124 are additionally or alternatively retained by the users 134, 136.

Figure 2:
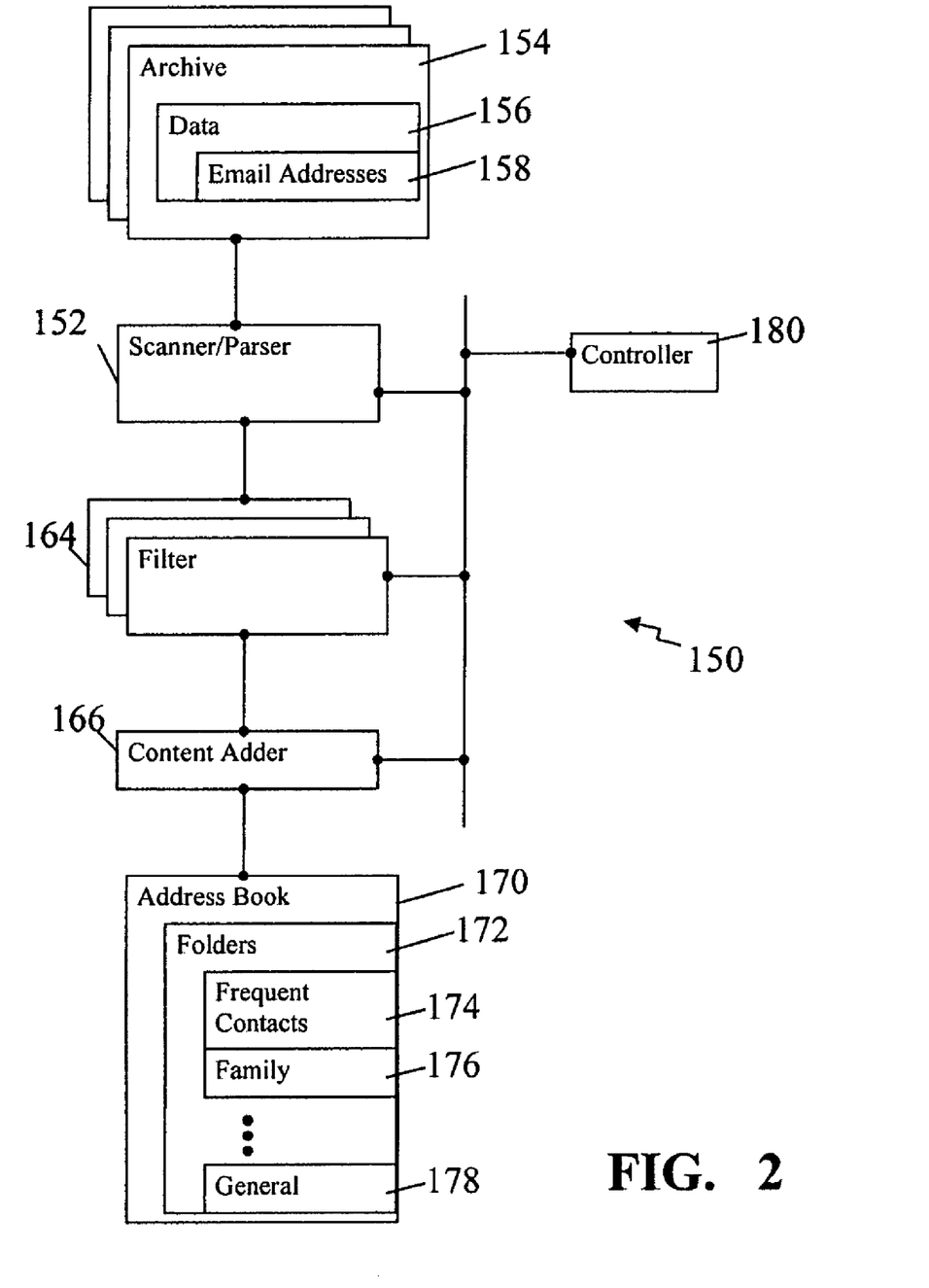
FIG. 2 depicts a simplified block diagram of an address book builder according to one embodiment of the present invention for generating and/or updating an address book.

FIG. 2 depicts a simplified block diagram of an address book builder 150 according to one embodiment of the present invention for generating and/or updating an address book 170. The components of the address book builder 150 can be incorporated on a single computer or server (e.g., host server 130 of FIG. 1), or distributed over multiple computers or servers (e.g., host server 130 and user computer 134). The address book builder includes a scanner, a searcher or other device 152 that accesses one or more archives and/or databases 154 to search for addresses that can be added to an address book 170. The archives can be co-located with the scanner (e.g., in host 126), can be in an external storage device, distributed across the network in a plurality of storage devices and/or stored at the user device. The archives 154 typically include data 156 that may contain addresses 158 which can be retrieved by the scanner 152. The scanner forwards the retrieved addresses to one or more filters 164. The filters apply predetermined or predefined factors or criteria to the addresses to determine the relevance of the address in association to the address book 170 being generated and/or updated. The factors or criteria can be substantially any factors or criteria that can distinguish addresses, such as frequency of use, address similarity (e.g., names, "@yahoo-.com", etc.), date associated with the address, and other such factors. Addresses that pass the one or more filters are forwarded to a content adder 166. The content adder receives the addresses that satisfy the criteria and stores those addresses into an address book 170.

In some embodiments, the content adder 166 can be configured to provide additional organization and/or priority to the addresses based on the criteria that is satisfied. For example, the address book builder can include one or more filters 164 that apply a first criterion or a first set of criteria. Further, the one or more filters can apply additional criteria or sets of criteria to the addresses retrieved. Those addresses retrieved by the scanner 152 that pass the first criterion or set of criteria but do not pass additional criteria can simply be stored in a general folder 178 of the address book 170. Those addresses retrieved by the scanner 152 that pass the additional criteria can be stored by the content adder 166 into the address book 170 in some priority format or organization, such as being stored in folders 172 within the address book (e.g., frequent contacts 174, family 176, and substantially any other folder). In some instances, the folders are generated within the address book and e-mail addresses are stored based on an organization of an archive from which the e-mail address is retrieved.

The address book builder 150 includes, in some embodiments, a controller 180, such as a microprocessor, a computer, digital signal processor or other similar controllers. The controller 180 can be configured to control the data flow and operation of the components of the address book builder.

In some embodiments, a user accesses and utilizes the address book builder of the present invention by accessing an e-mail service Internet web site. For example, the user can access an e-mail service such as Yahoo!® Mail (e.g., www-.mail.yahoo.com). Typically, the address book builder is run and operated from the host web site through the host device 126 (see FIG. 1). In operation, the address book builder can be initiated by the user through the e-mail service web site, or the e-mail service can automatically initiate the address book builder. As an example, the e-mail service can initiate the address book builder if the address book builder has not been initiated in a predefined number of days (e.g., 30 days).

Upon initiation, the address book builder parses or searches through archived data for e-mail addresses to include into a user's address book. Typically, the builder limits the search for e-mail addresses to the user's archives associated with the sending and receiving of e-mail. However, substantially any archive of data can be searched and/or parsed. Further, the address book builder typically limits the addresses that are added to the address book based on predefined criteria so that the addresses added have some relevance for the user. The criteria can be predefined by the address book builder (such as default criteria), can be defined by the user, can be defined by a third party (e.g., the e-mail service provider), other parties, or some combination thereof.

The present invention is not dependent on a single transmitted or received e-mail. To the contrary, the present invention utilizes one or more user e-mail databases or archives and extracts addresses from any number of received, sent, copied (CCed and/or BCCed) and/or trashed (or deleted) e-mails. In utilizing the plurality of possible entries the address book builder rapidly and easily creates, populates and/or updates an address book. Further, in utilizing the plurality of possible entries the address book builder generates a more relevant address book by filtering the possible entries based on defined parameters. Still further, the present invention parses through any number of previously received and/or sent e-mails as opposed to synchronizing the address book with another address book of another system by extracting previously entered addresses from another address book. However, the address book builder of the present invention can additionally "synchronize" with other address books by extracting and incorporating addresses from other electronic address books. In one embodiment, the present address book builder can further maintain the organization of the address book being incorporated.

Again, the address book builder 150 (see FIG. 2) typically limits the addresses added to the address book to those addresses meeting one or more criteria or limits. The address book builder can utilize predefined or default criteria. In one embodiment, the address book builder may present the user with criteria options that allow the user to select which criteria to use and/or define limits of the criteria. The criteria are used to limit the additions to a user's address book to those addresses that have some relevance to the user. The user can electronically be presented with criteria options, for example, over the Internet through a web site that provides access to and operation of the address book builder 150.

Figure 3:
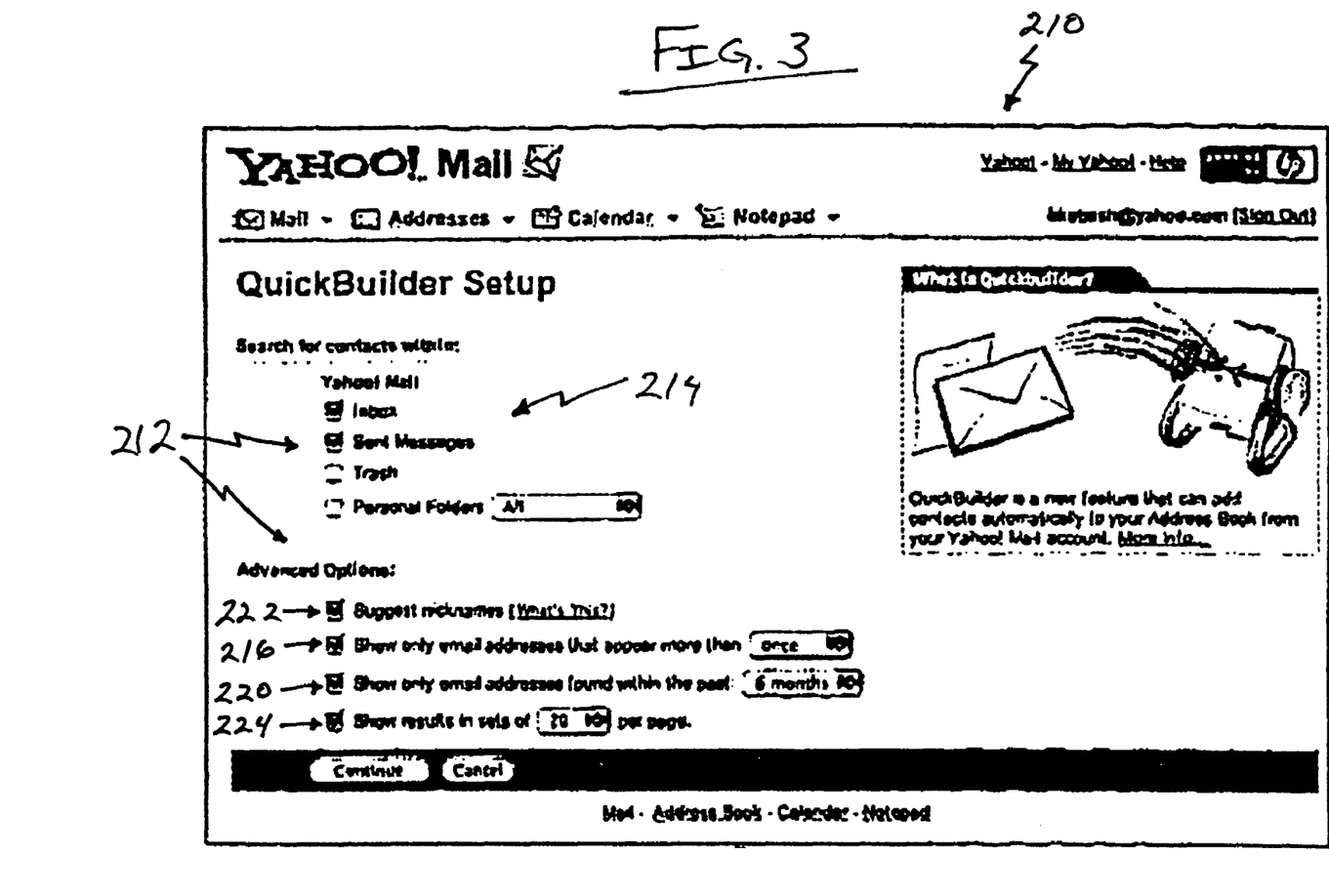
FIG. 3 depicts a screen shot of an example of a web site of an e-mail service providing a user with access to and use of an address book builder according to one embodiment of the present invention allowing the user to define the criteria used in limiting the population of the user's address book.

FIG. 3 depicts a screen shot of an example of a web site 210 of an e-mail service (for example, Yahoo!® Mail) providing a user with access to and use of an address book builder according to one embodiment of the present invention. In the web site 210 displayed, the address book builder allows a user to define the criteria 212 used in limiting the population of the user's address book. The criteria can restrict the search for addresses to certain e-mail folders 214 (such as "Inbox", "Sent Messages", "Trash", personal folders, and other such folders). Further, the criteria can limit the selection of addresses to those addresses that appear in one of the folders more than a predefined number of times 216 (e.g., more than once, more than three times, etc.). Further, the criteria can limit the selection of addresses to those that have been mailed to, copied, received from within a predefined time period 220 (e.g., within the last month, within the last six months, etc.) and other such criteria. Allowing the user to limit the entry to addresses that are found more than a predefined number of times prevents the addition of random or infrequent addresses, such as spammer addresses, obscure addresses and the like. Limiting the inclusion of addresses to those addresses having dates occurring within the predefined period ensures that the address book is current and is particularly advantageous for those users updating their address book. Substantially any number or type of criteria can be utilized to limit the addition of addresses into the user's address book.

In some embodiments, the address book builder additionally utilizes the user's organization of folders in organizing the address book. For example, the address book can mimic a user's previously organized e-mail folders creating equivalent folders within the address book and incorporating the retrieved addresses in those created address folders to maintain the user's organization (e.g., person contacts folder, business contacts folder, family contacts folder, softball team folder, and other similar folders).

In some embodiments, the user can further instruct the address book builder to search the user's alternative applications and/or devices, such as address books from other e-mail systems/services (for example, if the address book builder is being utilized with Yahoo!® Mail service, the user can set the criteria such that the address book builder further searches the user's address books within Microsoft Outlook®, Netscape®, AOL®, and other systems/services); other devices (e.g., personal digital assistant (PDA), computer and/or laptops); calendar tool that schedule events, meetings and/or invitations; other applications (such as Yahoo! Groups, Yahoo! Greetings and other similar applications); text messaging, and other such electronic address books, applications and archives. The address book builder can further organize the addresses retrieved from alternate applications, devices and external sources. For example, address folders can be created within the address book to maintain an organization of the addresses retrieved (such as an Outlook folder, an AOL folder, a Yahoo! Groups folder, a Yahoo! Greetings folder, and other similar folders).

The address book builder can further allow the user to specify other parameters for processing, displaying and/or storing the e-mail addresses. For example, the address book builder can additionally allow the user to instruct the address book builder to suggest nicknames 222 that the user can more easily remember and distinguish from other addresses in the user's book for the addresses that meet the criteria (e.g., the nickname can be a truncation of the first and/or last names). Additionally, the address book builder can allow the user to limit the number of addresses that are displayed on the screen 224 (e.g., displayed web page) once the address book collects the addresses that meet the predefined criteria.

Once the criteria is defined (either by default, by the user and/or other party), the address book builder searches through archived data to retrieve e-mail addresses. For example, the address book builder searches through the "To:", "From:" and "Cc:" fields of archived e-mails for e-mail addresses. In some embodiments, the address book builder additionally attempts to retrieve from the archives' searched additional information associated with the e-mail address, such as an individual's work contact information, home contact information, phone numbers and other such information, and other applications, devices and/or external archives. Once e-mail addresses are found, the address book builder filters the found addresses by applying the criteria. Those e-mail addresses that pass the criteria are recorded.

Figure 4:
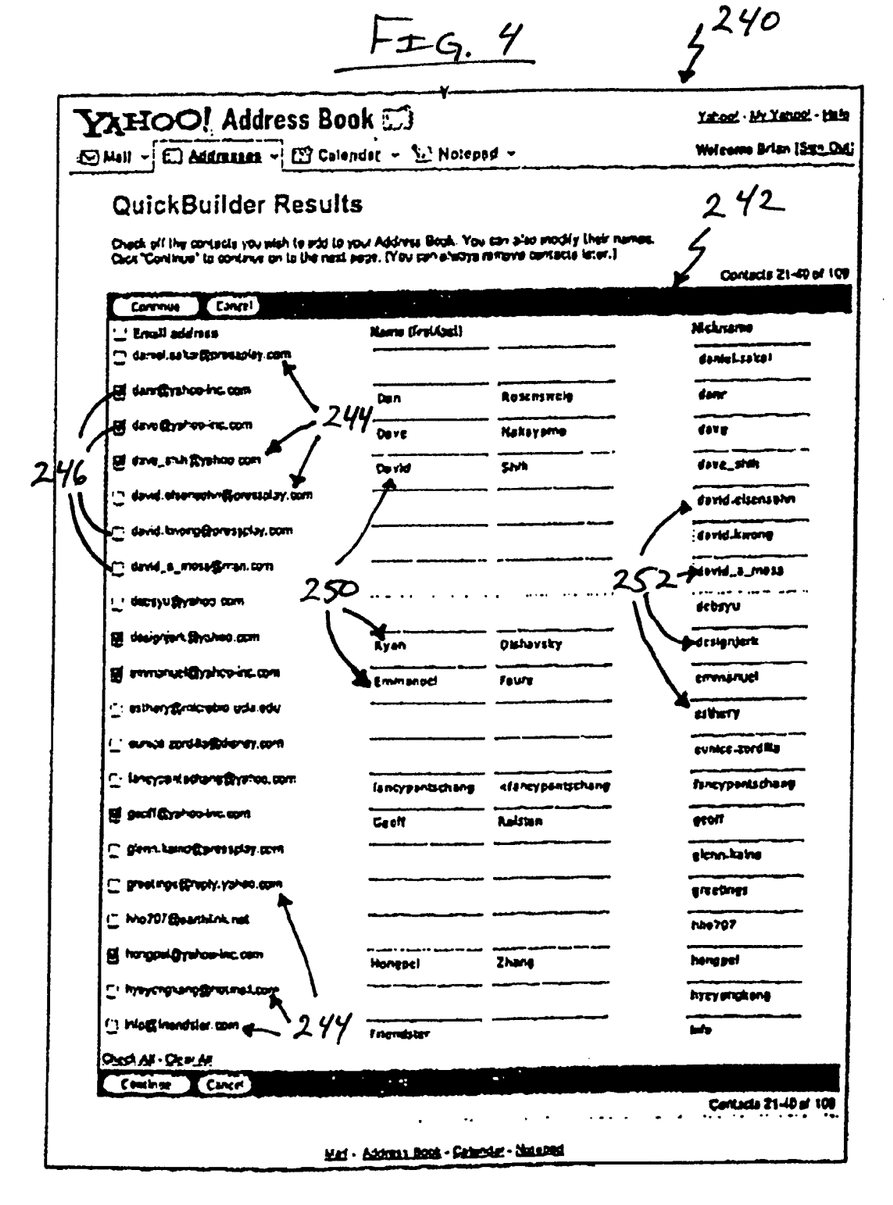
FIG. 4 depicts a screen shot of an example of a web site allowing a user to access and utilize the address book builder, where the address book builder provides a retrieved list of addresses retrieved by the address book builder from one or more archives.

In one embodiment, the e-mail addresses that pass the criteria are recorded into a retrieved list. FIG. 4 depicts a screen shot of an example of a web site 240 allowing a user to access and utilize the address book builder. The web site 210 displays a retrieved list 242 of addresses 244 retrieved by the address book builder from one or more archives. The address book builder 150 (see FIG. 2) can be configured to display the retrieved list 242 and to allow a user to confirm or deny entry of the retrieved addresses into the user's address book. The address book builder can allow the user to designate those addresses that the user confirms should be added to the user's address book. For example, the retrieved list can include a confirmation selection or box 246 before each of the retrieved addresses. The user can then select, using a pointer (e.g., a mouse), keys on a keyboard or other means for selecting, those addresses 244 that the user wants to add to the address book. Alternatively, the retrieved list can be configured to allow a user to select (or deselect) those e-mail addresses that are not to be added.

In some embodiments, the list of addresses on the retrieved list 242 can be sorted based on a predefined priority. The predefined priority can be a default or can be user defined. For example, the list can be sorted to display those addresses that occur the most often in the folders and/or archives searched. Similarly, the list can be arranged in a chronological order, such that a temporal/recency filter organizes the addresses based on a date associated with the address. For example, e-mail addresses can be displayed according to the dates they were sent and/or received. In some embodiments, the confirmation results are maintained in hidden fields within the web page.

The retrieved list 242 can additionally display a name 250 of the person, company, corporation and/or organization that is associated with the retrieved e-mail addresses 244 if available or ascertainable from the e-mail address and/or archives. Further, the retrieved list can include nicknames 252 generated by the address book builder based on the retrieved e-mail address and/or other information associated with the e-mail address. In one embodiment, the address book builder truncates the name associate with the e-mail address, a screen name associate with the address or other such information. The names and nicknames displayed in the retrieved list 242 can be editable to allow the user to change the names. In some embodiments, the retrieved list can include additional information and/or allow the user to add additional information or incorporate additional information. The retrieved list can include and/or allow the user to add address information, phone number(s), mobile phone numbers, work information (e.g., company, position, and the like), and other information related to the individual or corporation associated with an e-mail address being added to the address book. The additional related information can be included, edited and/or added through fields provided on the retrieved list 242, through pull down windows, through pop-up windows that include fields for entry (e.g., address field, phone number field, and the like), or other similar methods.

The retrieved list 242 can be displayed over any number of pages. As described above, in some embodiments, the user can specify (or based on predefined or default parameters) the number of e-mail addresses to be displayed on a single screen. Therefore, the retrieved list can span multiple pages. The user can scroll through the pages by selecting a forward button in the displayed window, by selecting a key on the keyboard (e.g., Page Down) or other similar operations. In the subsequently displayed page of the retrieved list, the user continues to confirm or select those addresses to be added to the user's address book. In some embodiments, the transition from one page of the retrieved list 242 to another page causes a save of the user's selection of the previous page incorporating those addresses confirmed by the user into the address book. Thus, if an interrupt occurs or other problem occurs the user does not have to repeat the process.

Other options can additionally be included into the retrieved list 242. For example, a category pull down menu can be provided for each address allowing the user to categorize the addresses.

The retrieved web site 240 can additionally include further control buttons, such as "Continue" to initiate the inclusion of the selected addresses into the address book, "Continue without Adding" allowing the user to continue the process without adding any addresses to the address book, "Cancel" or "Back" returning the user to the initial address book builder web site 210 or back to the e-mail service web site, "Delete", "Detail" to receive further details about a retrieved address if available (e.g., home address and phone numbers, etc.), "Select All", "De-select All", and other similar control functions.

Once the user selects or confirms those e-mail addresses the user confirms the list, for example, by selecting a continue button or confirmation button displayed on the screen, or selecting a key on a keyboard. Upon confirmation by the user, the address book builder processes the retrieved list as manipulated by the user and records those confirmed e-mail addresses (and associated data, e.g., name, nickname, office contact information, and the like) into the user's address book.

Figure 5:
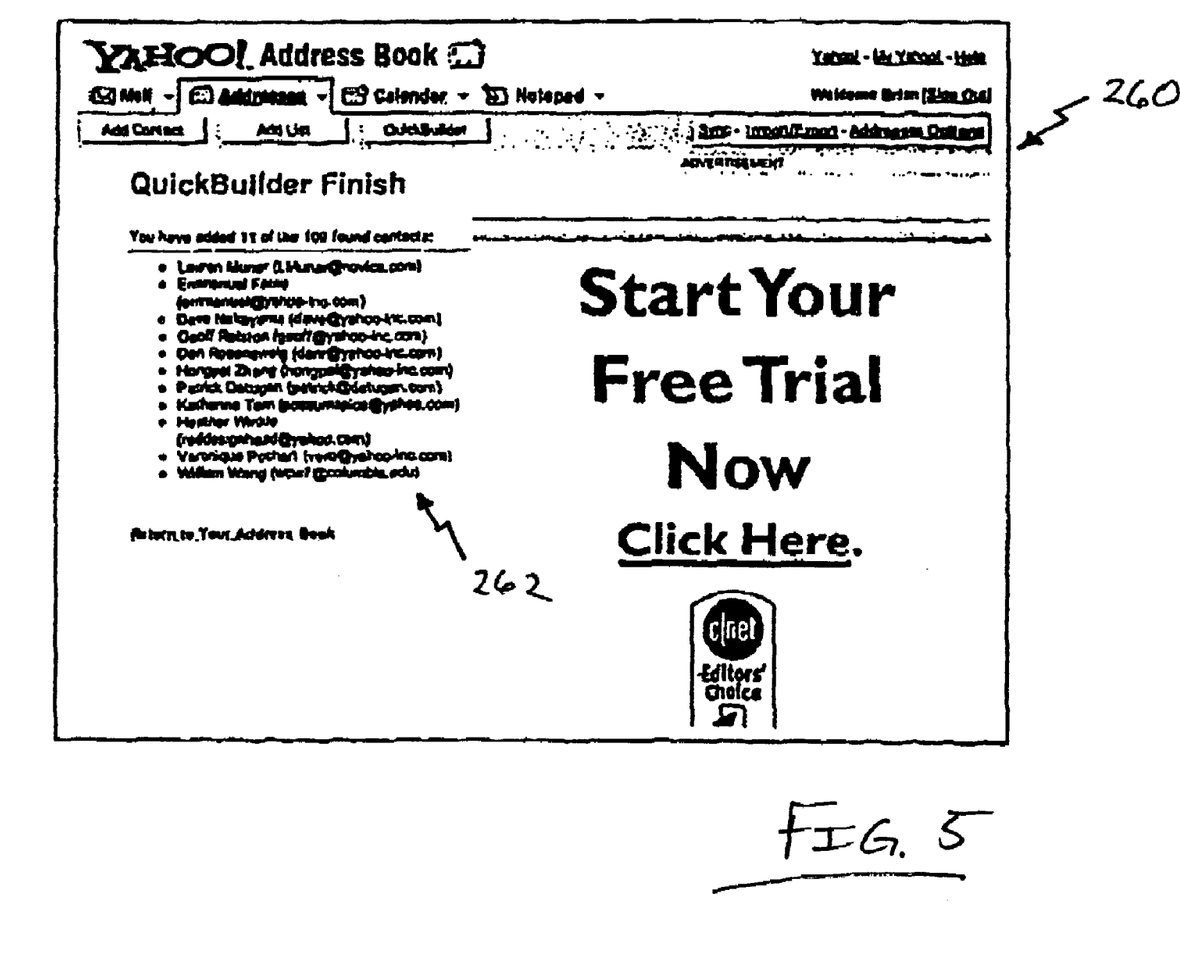
FIG. 5 shows a screen shot of an example of a web page generated by the address book builder verifying the addition of addresses.

In some embodiments, once the address book builder adds all of the confirmed addresses from the retrieved list 242 into the address book, a verification web page or a pop-up window can be displayed. FIG. 5 shows a screen shot of an example of a web page 260 generated by the address book builder verifying the addition of addresses. The verification page 260 can additionally include a verification list 262 of those addresses that were added to the user's address book. In some embodiments, the verified list of added names are determined by finding those entries into the address book that were added since the time the address book builder was initiated, which can be maintained as one or more hidden variables within the address book builder web page.

Figure 6:
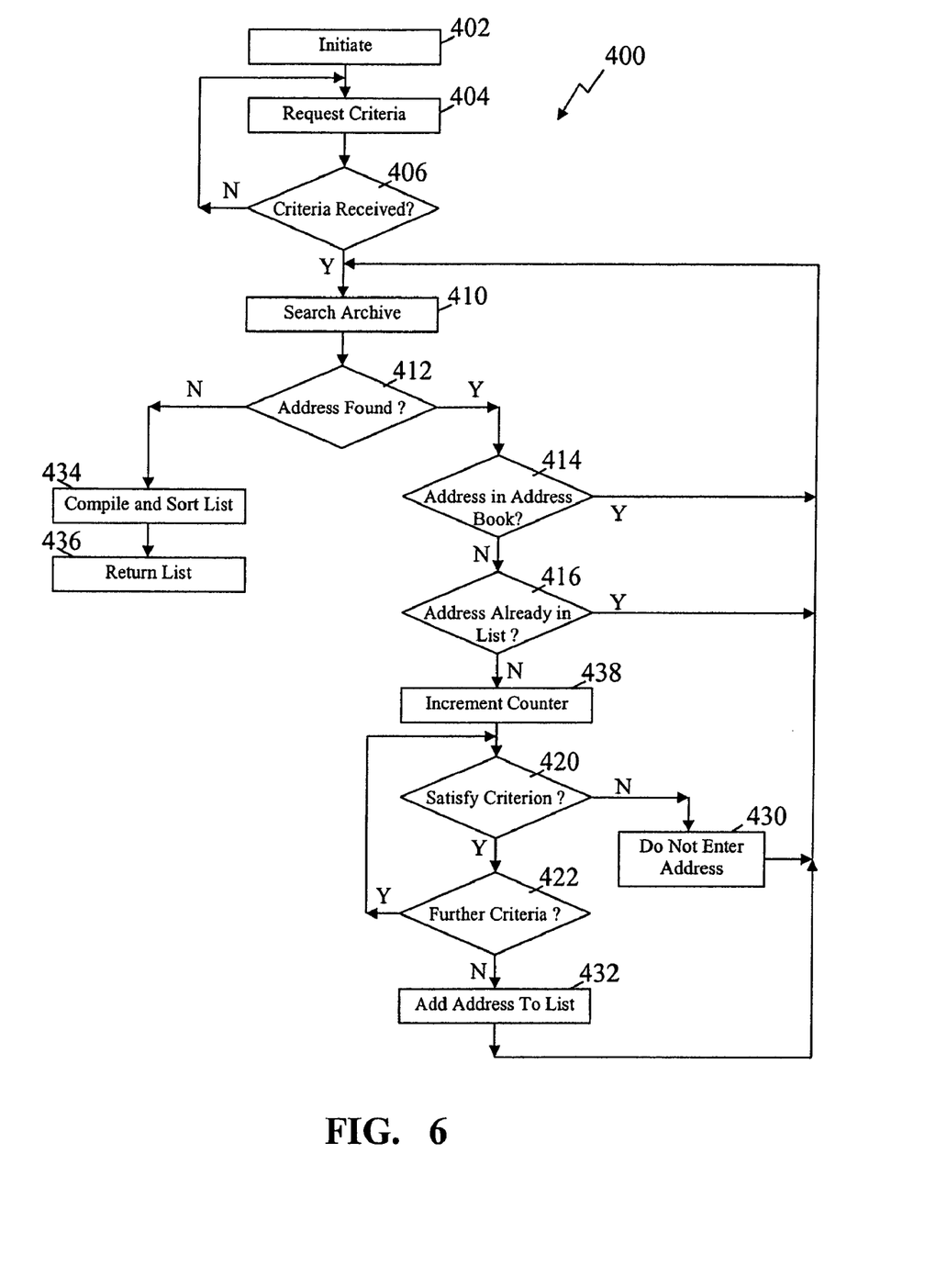
FIG. 6 depicts a simplified flow diagram of a process for use in generating, populating and/or updating an electronic address book and particularly for retrieving and evaluating one or more addresses according to one embodiment of the present invention.

FIG. 6 depicts a simplified flow diagram of a process 400 for use in generating, populating and/or updating an electronic address book and particularly for retrieving and evaluating one or more addresses according to one embodiment of the present invention. In step 402, the process for generating, populating and/or updating an address book is initiated. The initiation can be caused by a user specifically starting the process, or an e-mail system or service can start the process (e.g., the process may be initiated by a system periodically to maintain the address book current). In step 404, criteria are requested from a user. The criteria are used to limit the inclusion of identified and/or retrieved addresses so that those addresses added to the user's address book are relevant to the user. In step 406, it is determined if the criteria is received. If the criteria are not received, the process returns to step 404. If the criteria are returned, step 410 is entered where e-mail folders and/or other archives are searched for one or more addresses that might be added to the user's address book. In some instances, the criteria previously defined can dictate what folders and/or archives are searched.

In step 412 it is determined if at least one address is found. If not, the process proceeds to step 434 where the retrieved list is returned. If one or more addresses are identified, the process continues to step 414, where it is determined if the address retrieved has already been incorporated into the address book. In one embodiment, the process 400 utilizes a 1 bit hash table scheme for fast look ups to determine if the address is already in the address book. If the address is already present, the address is discarded and the process returns to step 410 to determine if other addresses were identified. If the address being evaluated is not included in the address book, step 416 is entered where it is determined if the retrieved address has already been added to the retrieved list 242. If the address has already been added to the retrieved list, the process continued to step 430. If the address is not in the retrieved list, the process proceeds to step 420.

In step 420, it is determined if the address meets and/or satisfies a further predefined criterion. For example, a first criterion can be applied where it is determined if the address has previously been found during the search through the archives. If the address being evaluated does not satisfy or meet the criterion the process proceeds to step 430 where the address is not entered or recorded into a retrieved list 242 (see FIG. 4). If the address satisfies the criterion, step 422 is entered, where it is determined if there further criteria that are to be applied to the address being evaluated. If there are further criteria, the process 400 returns to step 420 to evaluate the address based on further criteria (e.g., determining if an e-mail associated with the address sent and/or received within the last predefined period of time).

If there are no further criteria to be applied to the address being evaluated, step 432 is entered where the address is added to retrieved list. Following steps 430 and 432, the process returns to step 410 to search the one or more archives for additional e-mail addresses. In step 434 the retrieved list is compiled, sorted if sorting is applied. In step 436 the retrieved list is returned to the user.

In some embodiments of the process 400, following step 422, an additional optional step can be included where the process further evaluates the retrieved address based on organizational criteria before adding the address to the retrieve list. For example, the address can be evaluated to determine if the address was retrieved from a folder defined by the user (e.g., work contacts folder). Alternatively, this step of determining organization can be incorporated after the address has been confirmed by the user for addition into the address book (e.g., following step 454, described below in reference to FIG. 8).

Figure 7:
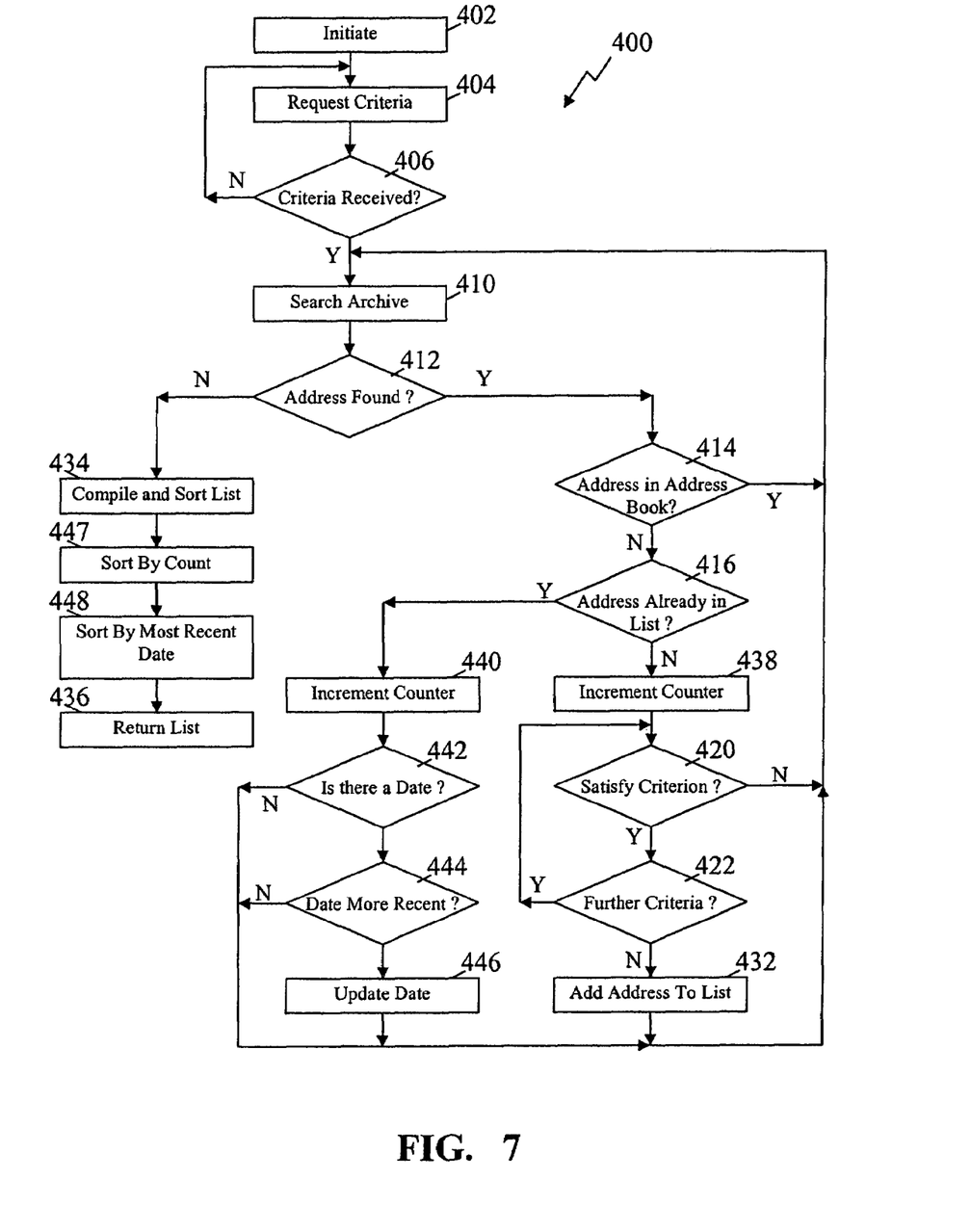
FIG. 7 depicts a simplified flow diagram of additional steps of the process shown in FIG. 6 for prioritizing the retrieved addresses.

Additionally, in some embodiments, the process 400 (see FIG. 6) can include additional steps for prioritizing retrieved addresses. FIG. 7 depicts a simplified flow diagram of a portion of the process 400 of FIG. 6 with additional steps for prioritizing the retrieved addresses. Again, step 416 determines if the address being evaluated is already included in the retrieved list. If the address is not in the list, the process 400 continues to step 438 where a counter associated with that address is incremented to a value of one (1). The process then continues to step 420 as shown in FIG. 6. If it is found in step 416 that the address is already included in the retrieved list, the process enters step 440 where a counter associated with that address is incremented to a value of one (1). In step 442 it is determined if there is a date associated with the address. For example, if the address is retrieved from an e-mail that was sent on a specific date, the date can additionally be retrieved. If it is found in step 442 that a date is not associated with the retrieved address, the process returns to step 410. If there is a date associated the process continues to step 444. In step 444, it is determined if the retrieved date is more recent than a previously retrieved date (if a date was associated with an earlier retrieve of the address). If the date is more recent, step 446 is entered and the date is updated to reflect the more recent date, and then the process returns to step 410. If it is found in step 444 that the retrieved date is not more recent, the date is not changed and the process 400 returns to step 410.

Still referring to FIG. 7, the process 400 additionally can return the retrieved list 242 (see FIG. 4) prioritized based on the determined priority of the addresses. Following step 434, the process can include step 447 where the retrieved list is sorted based on the highest count (i.e., the address found the most times in the one or more archives searched). Step 448 can additionally be included where those addresses with the same count are sorted with the addresses having the most recent associated dates being sorted as a higher priority. The process then returns the retrieved list in step 436.

Figure 8:
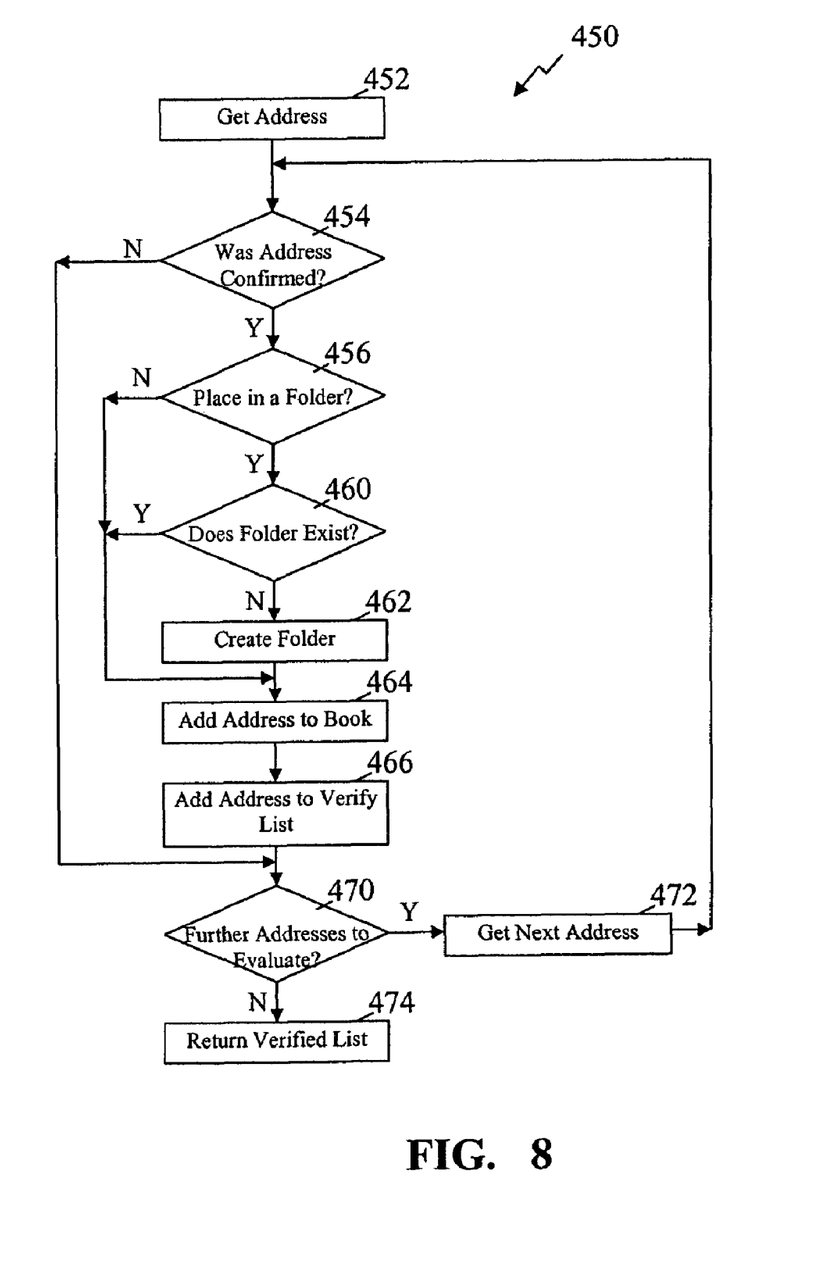
FIG. 8 depicts a simplified flow diagram of a process for use in generating, populating and/or updating an electronic address book and more specifically for adding addresses to an address book upon confirmation according to one embodiment of the present invention.

FIG. 8 depicts a simplified flow diagram of a process 450 for use in generating, populating and/or updating an electronic address book and more specifically for adding addresses to an address book upon confirmation according to one embodiment of the present invention. The process 450 can be utilized in cooperation with or independent of the process 400 of FIG. 6. Upon the return of the retrieved list, step 454 is entered where it is determined if an address (e.g., a first address) on the retrieved list was confirmed by the user to be entered into the address book. If the address being evaluated has not been confirmed the process proceeds to step 470. If the address was confirmed, step 456 is entered where it is determined if the address is to be placed into a folder based on an organization of the archive from which the address was retrieved. If the address is not to be placed into a predefined folder, the process proceeds to step 464. If the address is to be stored in a folder step 460 is entered where it is determined if the folder exists. If the folder does exist the process proceeds to step 464, otherwise the process proceeds to step 462 where the folder is created.

In step 464 the address is added to the address book, either in a general location or within a folder as determined above.

In step 466, the address is added to the verified list 262 (see FIG. 5). In step 470, it is determined if there are further addresses to evaluate. If not, the process proceeds to step 474. If there are further addresses to evaluate, step 472 is entered where the next address is determined. Following step 472, the process returns to step 454 to process the address. In step 474, the process finalizes the verification list 262 and returns the verification list to the user.

Figure 9:
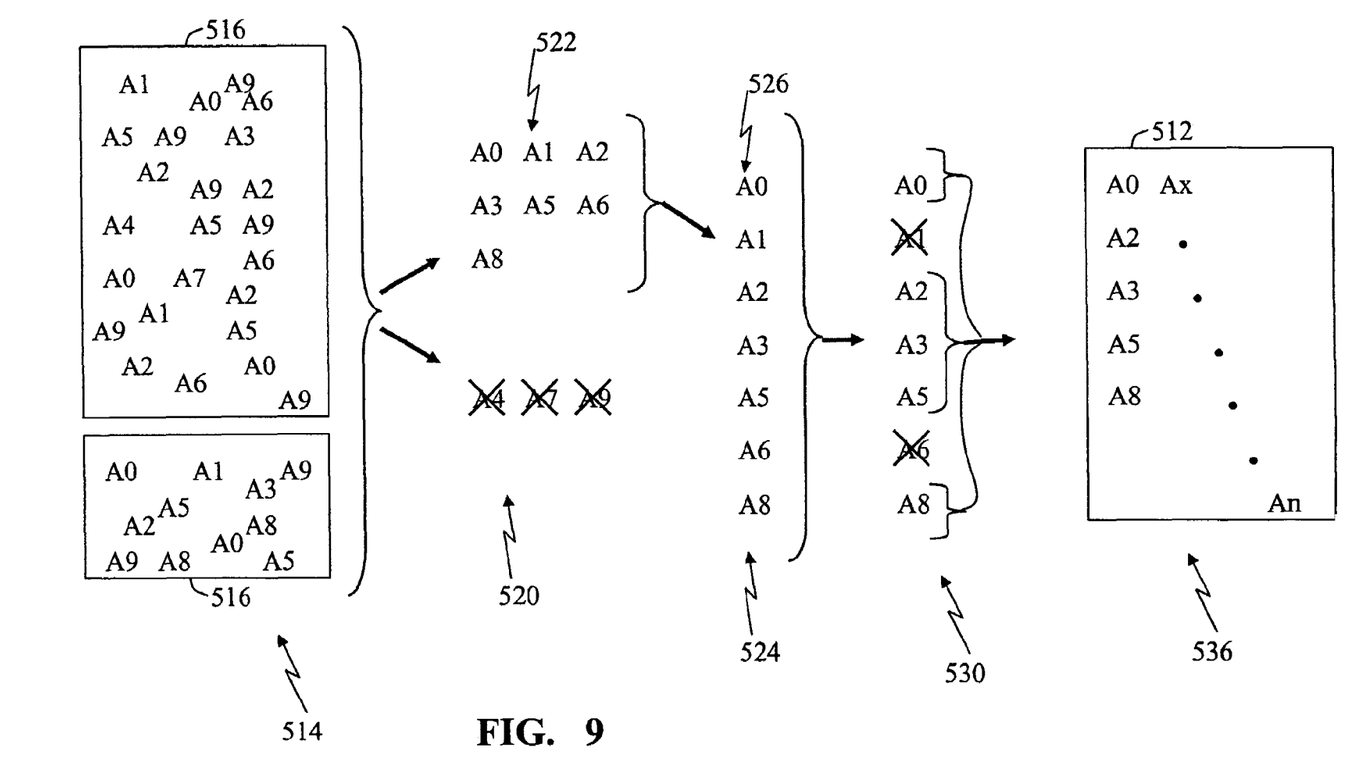
FIG. 9 is simplified state diagram showing the stages of operation of the of the address book builder in populating and/or updating an address book.

FIG. 9 is simplified state diagram showing the stages of operation of the address book builder in populating and/or updating an address book 512 according to one embodiment of the present invention. In a first state 514, one or more databases or archives 516 are accessed by the address book builder. The address book builder searches through the archives to find one or more contacts (such as e-mail addresses A0-A9) and/or data to be entered into the address book 512 (e.g., home or office addresses and/or phone numbers, text messaging addresses, and the like). In some embodiments, the archives are initially limited by a date limit. For example, when parsing through "To:", "Cc" and "From:" fields of a user's Yahoo! Mail account, the address book builder can limit the search to those e-mails sent or received after a predefined date.

Once the address book builder locates addresses it extracts those addresses and determines if the address already matches an address within the address book 512. The address book builder can further eliminate duplicate entries and can additionally apply criteria to the retrieved addresses and eliminate those that do not pass the criteria. In a second stage 520, the address book builder established a batch of candidates 522 that can be added to the address book. In a third stage 524, the batch of candidates 522 are arranged in a retrieved list 526. The retrieved list can be prioritized or otherwise arranged based on predefined parameters. For example, the addresses A0-A3, A5-A6 and A8 can be associated with received or sent e-mails and the priority can be based on the dates when the e-mails were sent or received. Other priority schemes can be utilized to arrange the candidate addresses.

In stage 530, the retrieved list 526 is provided to the user where the user can accept or deny entry of the candidate addresses into the address book 512. In some embodiments, the user can additionally alter or add information to the list. In stage 536, the confirmed addresses are added to the address book 512, to initially populate the address book or be added with previously entered addresses Ax-An when updating the address book.

The present invention can incorporate an addition relevancy filter that rates addresses associated with e-mails that were received by the user by further evaluating the e-mails. In one embodiment, the filter parses through any additional e-mail addresses to which the e-mail being evaluated was additionally addressed besides the user, including addresses that were copied (CCed or BCCed). If the particular e-mail is addressed to addresses already included in the user's address book, the e-mail address associated with the particular e-mail being evaluated is given a higher rating. Similarly, an e-mail can be parsed for language within the e-mail that is similar to language utilized in the user's outgoing e-mails. Similar language would result in a higher relevancy rating. Other similar relevancy evaluations can be employed to prioritize the retrieved e-mail addresses. In one embodiment, if the relevancy is determined to exceed a threshold level, the e-mail address can be added to the address book without the need for confirmation from the user.

In another aspect of the present invention, the methods illustrated in the flowchart descriptions above may be embodied in a computer program product. The computer program product includes a medium for embodying a computer program for input to a computer; and a computer program embodied in the medium according to well known programming techniques for causing the computer to perform the following functions: searching through at least one electronic archive of e-mails for e-mail addresses; evaluating a retrieved e-mail address based on a first defined criterion; and adding the e-mail address to an address book if the first criterion is satisfied. The computer program can further cause the computer to perform the following additional functions: evaluating the e-mail address based on a second criterion and adding the retrieved e-mail address to the electronic address book if both the first and second criteria are satisfied; and supplying a plurality of criteria options and receiving a selection of criteria including the first and second criteria.

The address book builder of the present invention provides a simple and easy way for users to generate, populate and/or update their address books by scouring the users' e-mails (sent, received, trashed) or other archives for new addresses not current included within the address book. The address book builder quickly populates a user's address book using e-mail addresses and names the user has already accumulated through the use of an e-mail tool, such as Yahoo! Mail, and other archives. Additionally, the address book builder can extract and incorporate a multiplicity of addresses at the same time. By collecting and adding a plurality of addresses to a user's address book, the address book builder of the present invention substantially eliminates the latency experienced by other address books in attempts to manually add addresses over the Internet.

The present invention has been described in relation to creating, populating, maintaining and updating an electronic address book for e-mail addresses. The present invention has further been described as being able to incorporate additional data associated with an e-mail address into the address book. However, the present address book builder can be configured to retrieve substantially any data type for entry into an address book. For example, the address book builder can be configured to search databases and/or archives for phone numbers and to retrieve the phone numbers (and potentially associated data) for entry into the address book. Similarly, the address book builder can search for addresses or other data that might be incorporated into a user's address book. The address book builder can additionally be utilized with text messaging to search for, retrieve and incorporate text messaging address and/or user names.

In some embodiments, the determination of whether retrieved content already exists in the address book is not limited to e-mail addresses. The evaluation of whether an entry already exits can additionally include information associated with the retrieved address. For example, if an address in an address book is for John Smith, without any further associated information, and the retrieved entry is for John Smith with a home address of 555 A Street, San Jose, Calif., the address book builder can be configured to enter the retrieved content or include the content on the retrieved list because the entry is different than what currently exists in the address book.

While the invention herein disclosed has been described by means of specific embodiments and applications thereof, numerous modifications and variations could be made thereto by those skilled in the art without departing from the scope of the invention set forth in the claims.

What is claimed is:

1. A computer implemented method for use in populating an electronic address book, comprising:

searching, over a network, through at least one archive of e-mails for an e-mail address, each of the at least one archive of e-mails being based on a different application from a first application used to initiate the searching; to receive a first defined criteria communicated over the network from a client browser during a communication session with the first application; and to create the electronic address book;

evaluating the e-mail address based on the first defined criterion, which limits the selection of the e-mail address based on a prior communication action performed using the e-mail address; and automatically adding the e-mail address to the electronic address book in a priority order based on the first defined criterion if the first defined criterion is satisfied, wherein the e-mail address is added to a folder within the electronic address book, such that the folder is with the application that is associated with the at least one archive that is associated with the e-mail address, wherein evaluating the e-mail address to the electronic address book further includes providing a relevancy rating for each e-mail address, and wherein factors that affect the relevancy rating of each e-mail address include: frequency of occurrence of the e-mail address, similarity of language in a body of the e-mail with language in outgoing e-mails, a date associated with the e-mail address, and whether the e-mail address associated with the e-mail containing other e-mail address already included in the electronic address book.

2. The method of claim 1, wherein the searching includes searching a "from" field, a "to" field and a "cc" field.

3. The method as claimed in claim 1, wherein the evaluating includes determining if the e-mail address already exists in the electronic address book, and not adding the e-mail address in the electronic address book if it already exists in the electronic address book.

4. The method of claim 3, wherein the evaluating includes evaluating the e-mail address based on a second defined criterion; and the adding includes adding the e-mail address to the electronic address book if both the first and the second defined criterion are satisfied, and not adding the e-mail address to the electronic address book unless both the first and second defined criteria are satisfied.

5. The method of claim 1, further comprising:

determining if the at least one archive from which the e-mail address was retrieved includes an organization of emails;

organizing the electronic address book according to at least a portion of the organization of the at least one archive from which the e-mail address was retrieved; and the adding includes adding the e-mail such that the e-mail address is added according to the organized address book.

6. The method of claim 1, further comprising:

generating a retrieved list of e-mail addresses retrieved during the searching that satisfy the first defined criterion; and the adding includes adding the e-mail addresses if the e-mail address is confirmed to be added.

7. The method of claim 6, further comprising:

generating a verification list of at least the e-mail address added to the address book.

8. The method of claim 6, further comprising:

receiving confirmation of additions based on the retrieved list prior to the adding the e-mail address.

9. A computer implemented method for use in generating and maintaining an address book, comprising:

accessing, over a network, an electronic archive comprising a list of e-mail addresses generated with a first application;

parsing, over the network, the electronic archive for the e-mail addresses, based on the first application;

applying a first criterion to a first retrieved e-mail address, wherein the first criterion is received over the network from a client browser during a communication session with a different application that generates a different archive comprising a different list of email addresses, and wherein the first criterion limits the selection of the retrieved e-mail address based on a prior communication action performed using the retrieved e-mail address; and adding the first retrieved e-mail address to an electronic address book in a priority order based on the first criterion if the first criterion is met, wherein the first retrieved e-mail address is added to a folder within the electronic address book that is identified with the different application, wherein applying the first criterion further includes providing a relevancy rating for each e-mail address, and wherein factors that affect the relevancy rating of each e-mail address include: frequency of occurrence of the e-mail address, similarity of language in a body of the e-mail with language in outgoing e-mails, a date associated with the e-mail address, and whether the e-mail address associated with the e-mail containing other e-mail address already included in the electronic address book.

10. The method of claim 9, wherein the applying includes applying a second criterion to the first retrieved address; and the adding includes adding the first retrieved address to the electronic address book if both the first and second criteria are met.

11. The method of claim 10, further comprising:

supplying a plurality of criteria options; and receiving a selection of criteria including the first and second criteria.

12. The method of claim 10, wherein the archive includes an archive of e-mails; and the parsing includes parsing a plurality of fields associated with each e-mail of the archive.

13. The method of claim 10, farther comprising:

accessing, over the network, an external archive comprising a second list of e-mail addresses generated with a second application;

parsing the external archive for e-mail addresses;

retrieving e-mail addresses from the external archive; and applying the first and second criteria; and adding the retrieved e-mail addresses from the external archive if the retrieved e-mail addresses from the external archives meet both the first and second criteria.

14. The method of claim 12, further comprising:

determining if the archive includes an organizational folder;

determining if the e-mail address was retrieved from the organizational folder; and generating the folder within the electronic addresses book.

15. The method of claim 12, further comprising:

generating a nickname in association with the first retrieved e-mail address; and adding the nickname associated with the first retrieved e-mail address to the electronic address book.

16. An apparatus for use in generating and updating an electronic address book, comprising:
- a transceiver in communication with the network;
- a processor in communication with the transceiver; and
- a memory in communication with the processor, and storing processor executable instructions that cause the processor to perform a plurality of actions, including:
- an electronic address book configured to store one or more e-mail addresses;
- means for scanning, over a network, configured to search one or more archives for at least one e-mail address and to retrieve the at least one e-mail address, wherein each of the one or more archives is generated with a different application from a first application used to initiate the search; to filter the e-mail address according to a criterion communicated over the network from a client browser during a communication session with the first application; and to create the address book;
- means for filtering configured to receive the at least one e-mail address from the means for scanning and to pass the e-mail address if the e-mail address satisfies the criterion of the means for filtering, wherein the criterion limits the selection of e-mail address based on a prior communication action performed using the e-mail address; and
- means for adding configured to add the at least one e-mail address to the address book in a priority order based on the criterion if the at least one address is passed by the filter, wherein the e-mail address is added to a folder within the address book such that the folder is identified with the different application, wherein the means for filtering is further configured to provide a relevancy rating for each e-mail address, and wherein factors that affect the relevancy rating of each e-mail address include: frequency of occurrence of the e-mail address, similarity of language in a body of the e-mail with language in outgoing e-mails, a date associated with the e-mail address, and whether the e-mail address associated with the e-mail containing other e-mail address already included in the address book.

17. The apparatus of claim 16, wherein the archive includes a plurality of e-mails having a plurality of fields; and the means for scanning is configured to scan the plurality of fields of the plurality of e-mails.

18. A computer readable medium encoded with code segments for use in populating an electronic address book, the computer readable medium comprising:
- a code segment for searching, over a network, through at least one electronic archive of e-mails for e-mail addresses, each of the at least one electronic archive of emails being based on a different application from a first application used to initiate the searching; to receive a first defined criteria communicated over the network from a client browser during a communication session with the first application; and to create the electronic address book;
- a code segment for evaluating a retrieved e-mail address based on the first defined criterion, which limits the selection of the retrieved e-mail address based on a prior communication action performed using the retrieved e-mail address; and
- a code segment for adding the retrieved e-mail address to the electronic address book if the first defined criterion is satisfied, wherein the retrieved email address is added to a sub-folder within the electronic address book, such that the sub-folder is identified with the different application, wherein the code segment for evaluating is further configured to provide a relevancy rating for each e-mail address, and wherein factors that affect the relevancy rating of each e-mail address include: frequency of occurrence of the e-mail address, similarity of language in a body of the e-mail with language outgoing e-mails, a date associated with the e-mail address, and whether the e-mail address associated with the e-mail containing other e-mail address already included in the electronic address book.

19. The computer readable medium of claim 18, further comprising:
- a code segment for evaluating retrieved the e-mail address based on a second criterion; and
- the code segment for adding is configured to add the retrieved e-mail address to the electronic address book if both the first and second criteria are satisfied.

20. The computer readable medium of claim 19, further comprising:
- a code segment for supplying a plurality of criteria options; and
- a code segment for receiving a selection of criteria including the first and second criteria.

21. An apparatus for use in populating an electronic address book over a network, comprising:
- a transceiver in communication with the network;
- a processor in communication with the transceiver; and
- a memory in communication with the processor, and storing processor executable instructions that cause the processor to perform a plurality of actions, including:
- accessing, over the network, a plurality of archives of e-mails for an e-mail, each of the plurality of archives of e-mails being within a different one of a plurality of applications;
- parsing the e-mail to obtain an e-mail address based at least in part on a first one of the plurality of applications that is associated with the e-mail, and to determine a relevance rating for the email address based on whether language in a body of the e-mail is utilized in outgoing e-mails in a selected user's archive of outgoing e-mails that is within a second one of the plurality of applications;
- automatically adding the e-mail address to the electronic address book in a priority order based on the relevance rating, wherein the e-mail address is added to a folder within the electronic address book, such that the folder is identified with the first one of the plurality of applications that is associated with the email; and
- providing to a user device, over the network, an access to the electronic address book, wherein adding the e-mail address to the electronic address book further includes providing a relevancy rating for each e-mail address, and wherein factors that affect the relevancy rating of each e-mail address include: frequency of occurrence of the e-mail address, similarity of language in a body of the e-mail with language in the outgoing e-mails in the selected user's archive of outgoing emails, a date associated with the e-mail address, and whether the e-mail address associated with the e-mail containing other e-mail address already included in the electronic address book.

22. The apparatus of claim 21, wherein adding the e-mail address to the electronic address book further comprises adding the e-mail address if the e-mail address occurs at a certain frequency, wherein the e-mail address is automatically excluded if the e-mail address occurs below the certain frequency, the e-mail address is similar to another e-mail address, or a date associated with the e-mail address meets a threshold.

23. The apparatus of claim 21, wherein the electronic address book is stored at least on one of the user device, the apparatus, or another network device.

24. The apparatus of claim 21, wherein at least one of the plurality archives of e-mails is stored on the apparatus, the user device, or another network device.

25. The apparatus of claim 21, wherein the parsing further comprises sending a parsing instruction to cause remote parsing of the e-mail on a network device which stores the plurality of archives of e-mails.

26. An apparatus for use in populating a destination electronic address book over a network, comprising:
   a transceiver in communication with the network;
   a processor in communication with the transceiver; and
   a memory in communication with the processor, and storing processor executable instructions that cause the processor to perform a plurality of actions, including:
      accessing a first source electronic address book for a first e-mail address that is also associated with a first phone number, the first source electronic address book comprising a list of e-mail addresses generated with a first application that is different from a destination application used to generate the destination electronic address book;
      evaluating the e-mail address based on a first defined criterion that includes a frequency with which the e-mail address is detected in an archive of e-mails that are associated with the destination electronic address book; and
      adding the e-mail address and the phone number to the destination electronic address book if the first defined criterion is satisfied, wherein the e-mail address and phone number are added in a priority order based on the first defined criterion into a folder of the destination electronic address book that is associated with the first defined criterion and is identified with the first application, wherein evaluating the e-mail address further includes providing a relevancy rating for each e-mail address, and wherein factors that affect the relevancy rating of each e-mail address include: frequency of occurrence of the e-mail address, similarity of language in a body of the e-mail with language in outgoing e-mails, a date associated with the e-mail address, and whether the e-mail address associated with the e-mail containing other e-mail address already included in the electronic address book.

27. The apparatus of claim 26, wherein the actions further comprising:
   accessing a second source electronic address book for a second e-mail address, the second source electronic address book comprising a list of e-mail addresses generated with a second application;
   evaluating the second e-mail address based on the first defined criterion; and
   adding the second e-mail address to the destination electronic address book if the first defined criterion is satisfied.

* * * * *

UNITED STATES PATENT AND TRADEMARK OFFICE
CERTIFICATE OF CORRECTION

| | |
|---|---|
| PATENT NO. | : 7,539,699 B2 |
| APPLICATION NO. | : 10/624733 |
| DATED | : May 26, 2009 |
| INVENTOR(S) | : Brian T. Kobashikawa et al. |

It is certified that error appears in the above-identified patent and that said Letters Patent is hereby corrected as shown below:

In column 13, line 51, in claim 5, delete "emails;" and insert -- e-mails; --, therefor.

In column 14, line 15, in claim 9, delete "email" and insert -- e-mail --, therefor.

In column 14, line 47, in claim 13, delete "farther" and insert -- further --, therefor.

In column 15, line 51, in claim 18, delete "emails" and insert -- e-mails --, therefor.

In column 15, line 64, in claim 18, delete "email" and insert -- e-mail --, therefor.

In column 16, line 39, in claim 21, delete "email" and insert -- e-mail --, therefor.

In column 16, line 49, in claim 21, delete "email;" and insert -- e-mail; --, therefor.

In column 16, line 59, in claim 21, delete "emails," and insert -- e-mails, --, therefor.

Signed and Sealed this

Twenty-eighth Day of July, 2009

JOHN DOLL
*Acting Director of the United States Patent and Trademark Office*